UNITED STATES PATENT OFFICE.

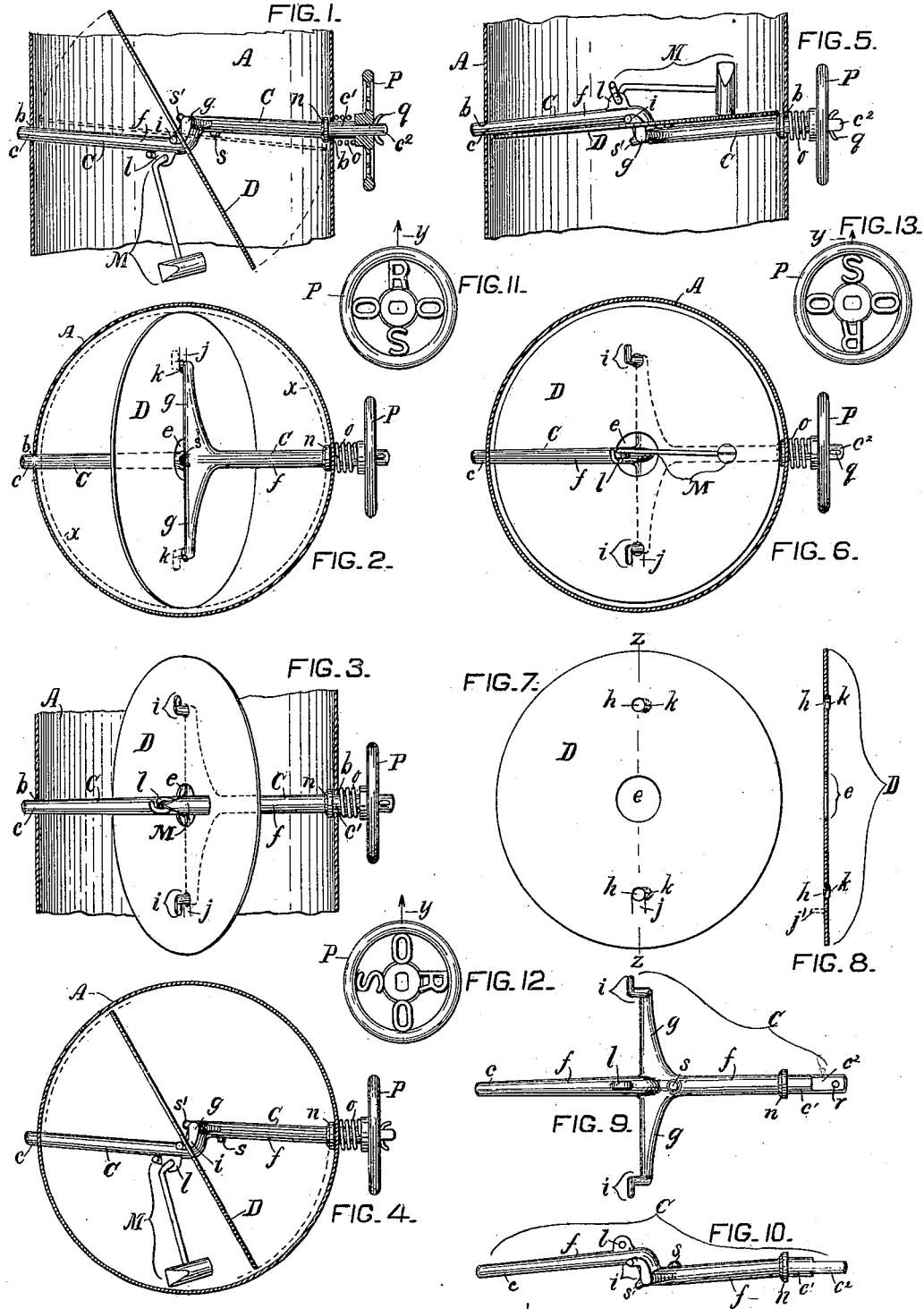

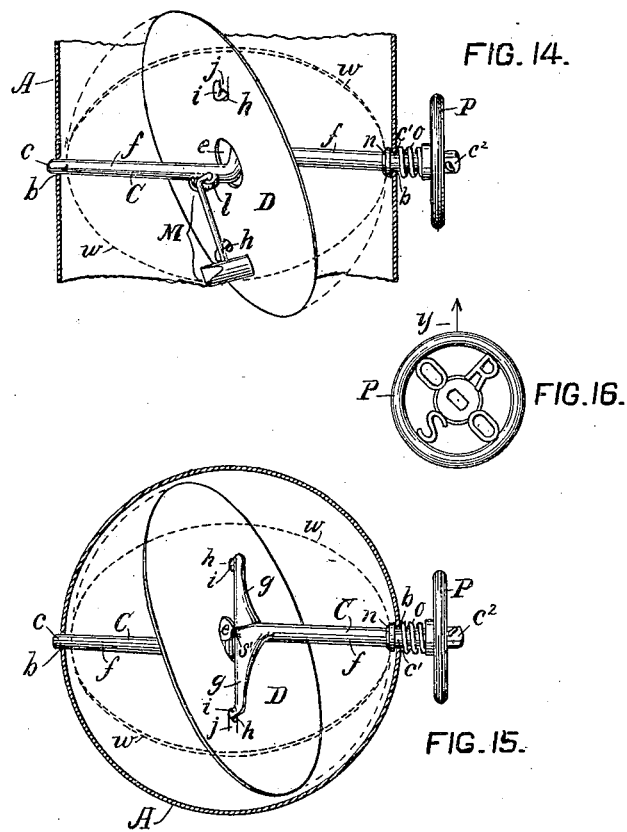

ASHBELL BARNUM, OF GREEN ISLAND, NEW YORK.

STOVE-PIPE DAMPER.

SPECIFICATION forming part of Letters Patent No. 246,709, dated September 6, 1881.

Application filed June 4, 1881. (Model.)

*To all whom it may concern:*

Be it known that I, ASHBELL BARNUM, a citizen of the United States, residing in the village of Green Island, in the county of Albany and State of New York, have invented certain new and useful Improvements in Stove-Pipe Dampers, of which the following is a specification, reference being had to the accompanying drawings.

My invention relates to improvements in self-regulating stove-pipe dampers in which a damper-plate is hinged, fulcrumed or pivoted, and balanced to vibrate on a support which is adapted to be turned and thereby adjusted in opposite perforations through the pipe, either so that the damper-plate shall be moved by the draft, and thereby more or less close the passage through the pipe, and thus regulate the draft, or so that the damper-plate shall keep the passage through the pipe either open or closed to various degrees or to the fullest extent.

The general objects of my invention are to lessen the cost of such dampers, render them less liable to get out of order in use, and to so mount the damper-plate that the same and fullest extent of vibrative movements can be imparted to it by the draft through the pipe, when the support for the damper-plate shall be so differently adjusted that the same extent of such movement of the damper-plate shall close and open the passage through the pipe different degrees.

In the aforesaid drawings, Figure 1 is an elevation, partly in section, and Fig. 2 is a plan, of one of my improved dampers so adjusted in a section of a pipe that a sufficient draft through the pipe can turn the damper-plate on its support, and thereby close the pipe to the fullest extent. Fig. 3 is an elevation, and Fig. 4 a plan, of the same damper so adjusted in a section of pipe that the passage through the latter will be kept open to the greatest degree, however much the damper-plate may be turned on its support by the draft. Fig. 5 is an elevation, and Fig. 6 a plan, of the same damper so adjusted in a section of pipe that the damper-plate closes the passage through the pipe to the fullest degree, and cannot be moved by the draft through the pipe. Fig. 7 is a plan, and Fig. 8 a section, at the line $z\ z$ in Fig. 7, of the damper-plate alone; and Fig. 9 is a plan, and Fig. 10 an edge elevation, of the support for the damper-plate. Fig. 11 shows the position of the indicator-wheel of the damper when the same is adjusted in the position shown in Figs. 1 and 2. Fig. 12 represents the position of the same wheel when the damper is set as in Figs. 3 and 4, and Fig. 13 indicates the position of the same wheel when the damper is adjusted as shown in Figs. 5 and 6. Fig. 14 is an elevation, and Fig. 15 a plan, of the same damper when adjusted in a section of pipe, so that while the damper-plate can be moved to the greatest extent by the draft the damper-plate cannot thereby close the pipe to the fullest degree. Fig. 16 shows the position of the indicator-wheel when the damper is adjusted as represented in Figs. 14 and 15.

A is a section of pipe, having diametrically-opposite perforations $b\ b$.

C is a support, of which the end parts, $c\ c'$, are pivots or journals, adapted to fit and be turned or revolved in said perforations.

D is the damper-plate, which is mounted to vibrate on said support.

In the damper described in United States Patent No. 175,642 to myself and J. A. Wishart the damper-plate was pivoted on a rotary supporting-shaft so as to vibrate thereon about an axis essentially parallel to the axis of rotation of the supporting-shaft, which shaft had a lateral arm that limited the vibrative movement of the damper-plate by the draft and altered the extent of that movement according to the position to which the shaft was turned and adjusted in the pipe, so that when the supporting-shaft was set so as to permit the draft to turn the plate so as to only partly close the passage through the pipe the plate could then be acted upon and moved by the draft only partly as far as when the shaft was set so that the draft could so move the plate as to close the passage through the pipe to the fullest degree. To avoid that defect and cause the draft to act against and move the damper-plate the same distance and to its fullest extent, whether the damper shall be adjusted to more or less close the passage through the pipe by the action of the draft, I mount the damper-plate D to vibrate on the support C about an axis at right angles, or nearly so, to the axis of rotation of the support C, and limit the closing movement of the damper-plate by a stop on the support at or near the axis of the latter. In accomplishing that object the support could be in the form of a ring having the end pivots, c c', and surrounding a damper-plate pivoted to the ring, so as to turn therein about an axis perpendicular to the axial line of said end pivots of the support. I prefer, however, to make the damper-plate D with a central aperture, e, and have the support C in the form of a shaft, f, extending through the aperture e, and having lateral arms g g, on which the damper-plate is mounted in such a manner as to vibrate about an axis perpendicular, or nearly so, to the axial line of the journals c c' of the shaft, so that the shaft will limit the vibrative movement of the damper-plate.

In the damper described in the aforesaid patent the damper-plate was mounted on its supporting-shaft by pivots on the damper-plate fitting in holes or sockets in projections on one side of the shaft, which pivots and holes or sockets were quite expensive to form, and the pivots were liable to become stuck fast or obstructed in their holes or sockets by their rusting and by the filling in of soot and ash-dust, so as to prevent or retard the movement of the damper-plate by the action of the draft.

To avoid or lessen those difficulties I mount the plate D upon the arms g g of the support C by making the plate with two perforations, h h, diametrically opposite, or nearly so, and by forming the arms with bent or angular end lugs, i i, which are shaped so that they can be easily cast in one and the same piece with the arms g g and shaft f, and so as to fit loosely in and extend through the perforations h h in the plate D, and thereby nicely fulcrum and secure the latter upon the arms of the support by open joints, which will keep clear in use.

To provide for easily mounting the plate D on the fulcrum-lugs i i of the support, I commonly make the plate of bendable metal—as sheet-iron—and form at the edge of one of its perforations a tongue, j, which can be bent outward from the plane of the plate somewhat as indicated by dotted lines at j' in Fig. 8, so as to permit the insertion of one of the two lugs in the last-named perforation after the other lug has been put into the other perforation, and which tongue j, after such insertion of the two lugs in the two perforations, can be bent back into the plane of the plate D, so as to retain the lugs therein.

Fig. 7 shows the fulcrum-points k k of the plate D in a line at one side of and parallel to the diametrical line z z, so that the two parts of the plate on opposite sides of the line through the fulcrum-points are of different areas and weights. Hence when the fulcrum-points k k bear on the lugs i i the largest and heaviest part of the plate D will hang downward, and to cause the plate to then take by its gravity an inclined position, as indicated in Figs. 1, 2 and 14, 15, the fulcrum parts k k are bent a little laterally to the plane of the plate and its center of gravity, as indicated in Fig. 8. Consequently, with the damper-plate thus made and suspended on the pivot-lugs i i, the upward draft through the pipe will exert against the inclined under surface of the plate a greater amount of pressure on the larger and lower area at one side of the line through the fulcrum-points k k than against the smaller upper area at the other side of that line, and will thereby turn the damper-plate on the pivots i i, and thus close the passage through the pipe to degrees corresponding with the strength of the draft.

To make the damper-plate D keep the passage through the pipe closed to a uniform extent when the support C shall be set with one particular side uppermost, as in Figs. 5 and 6, I hinge or joint to the support, as at l, a weighted arm, M, in such manner that the arm can be moved by its gravity in a plane about parallel to the axial line of the journals c c' of the support and perpendicular to the axis of vibration of the plate D, so that whenever the support C shall be set with the arm M uppermost that arm will then fall and bear on the plate D and hold it closed against the support, as indicated in Figs. 5 and 6, and so that whenever the weighted arm M shall be below the support C the arm will then hang away from the plate D, as in Fig. 1, and will not interfere with the proper movements of the plate, which will then assume a somewhat inclined position, as in Figs. 1 and 2 or 14 and 15, ready to be turned on the support by the action of the draft.

The damper can be mounted in the pipe A, having the opposite holes b b, by first putting the end stem, c', Figs. 9 and 10, from inside the pipe outward through one of the holes, and then springing the pipe flatwise and inserting the other end part, c, in the other hole.

For holding the damper in whatever position it shall be adjusted in in the pipe, the support is formed with a collar, n, to fit against the inner surface of the pipe, and with the damper in the pipe a spring, o, is placed on the stem c' and compressed against the outer surface of the pipe, and secured in such condition by an indicator-wheel, P, fitting on a flattened part, c², of the stem c', and secured thereon by a pin, q, through a hole, r, in the stem; but any suitable known means can be used for keeping the damper in the various positions in which it can be adjusted in the pipe. The arrow-head y in Figs. 11, 12, 13, and 16 indicates the upper side of the indicator-wheel in those figures.

In Figs. 1 and 2 the damper is so adjusted that the draft through the pipe can turn the plate D into such position as to close the passage through the pipe to the greatest degree, as indicated by the dotted lines x x in Fig. 2. In Figs. 14 and 15 the damper is set so that the draft through the pipe can turn the plate D only so as to partly close the passage through the pipe, as indicated by the dotted lines w w in Fig. 15. Yet the plate D can be turned the same distance by the draft through the pipe when the damper is adjusted in the position shown in Figs. 14 and 15 as when it is set as represented in Figs. 1 and 2.

To prevent or lessen the production of sound by the striking of the outer portion of the disk D against the support C and weighted arm M when the disk is being operated by the draft, I commonly form the support with stops $s$ $s'$ for the inner parts of the disk to strike against at the ends of its vibratory movements.

To furnish my improved damper at the cheapest rates to users, and to supply the wants of dealers and sheet-metal workers throughout the country, it is generally best to have the supports C cast in large quantities, as separate salable articles, in one foundry or in a few foundries, and to thence transport the same to many different and widely-separated localities at or near the places where the dampers shall be completed by the addition of the disk D, which latter can be manufactured in large quantities as a separate salable article, adapted for use on the supports C, either in the first instance or after other disks have become rusted or burned out in use on the supports in stovepipes.

I do not herein broadly claim a damper composed of a support having end pivots adapted to be turned in opposite perforations in a pipe, and a circular plate mounted on the support and adapted to be turned or vibrated thereon by the action of the draft through the pipe, so as to more or less close the pipe and lessen or regulate the draft when the support is adjusted properly. Such a damper is shown and described in the aforesaid Patent No. 175,642, and has the damper-plate mounted to vibrate on the support about an axis essentially parallel to and at one side of the axis of the end pivots of the support, and is furnished with a stop arranged so that the arc through which the plate can be turned or vibrated by the draft is injuriously lessened in length as the damper is adjusted to close the pipe less by the action of the draft against the plate.

In my present improved damper the plate thereof is so mounted on the rotary support as to be turned by the draft about an axis essentially perpendicular or at right angles to the axis of the pivots of the support, and is furnished with a stop arranged so that the length of the arc through which the plate can be turned by the draft is constantly the same, whether the damper is adjusted to more or less close the pipe by the action of the draft against the plate.

What I claim as my invention is—

1. The combination, with the support having opposite end pivots, of the plate, mounted as described, and adapted to vibrate a limited distance on said support about an axis essentially at right angles to the axis of the end pivots of the support, substantially as described.

2. A damper composed of the plate D, having the aperture $e$ in its middle, and a support consisting of a shaft, $f$, extending through said aperture in the plate, and having end pivots, $c$ $c'$, and lateral arms $g$ $g$, said plate being mounted on said arms and adapted to vibrate thereon about an axis essentially perpendicular to the axial line of the end pivots of the shaft, substantially as described.

3. A damper composed of a support having the shaft $f$, with end pivots, $c$ $c'$, and lateral arms $g$ $g$, with end lugs, $i$ $i$, and the plate D, having the middle aperture, $e$, and opposite perforations $h$ $h$, whereby the plate is mounted to vibrate on the support, substantially as set forth.

4. A damper composed of a support having a shaft, $f$, with end pivots and lateral arms $g$ $g$, the plate D, having a central aperture, through which the shaft extends, and mounted on said arms to vibrate about an axis essentially perpendicular to the axial line of the end pivots of the shaft, and the weighted arm M, jointed to said shaft and arranged to operate upon said plate, substantially as described.

5. The improved damper-support, composed of the shaft $f$, having the end pivots, $c$ $c'$, and the lateral arms $g$ $g$, having the fulcrum-lugs $i$ $i$, all shaped, arranged, and made in one piece substantially as set forth.

6. The damper-plate D, having the central aperture, $e$, diametrically opposite perforations $h$ $h$, and the bendable tongue $j$, all substantially as set forth.

In testimony whereof I hereunto set my hand, in the presence of two subscribing witnesses, this 1st day of June, 1881.

ASHBELL BARNUM.

Witnesses:
AUSTIN F. PARK,
JOHN J. RAFFERTY.